United States Patent [19]

Sasaki et al.

[11] Patent Number: 4,985,100
[45] Date of Patent: Jan. 15, 1991

[54] PROCESS FOR BUILDING PNEUMATIC RADIAL TIRES WHEREIN TWO BUILDING DRUMS ROTATE BETWEEN TWO BUILDING POSITIONS

[75] Inventors: Naoki Sasaki, Hiratsuka; Katuhide Kawaguchi, Numazu, both of Japan

[73] Assignee: The Yokohama Rubber Co., Ltd., Tokyo, Japan

[21] Appl. No.: 360,700

[22] Filed: Jun. 2, 1989

[30] Foreign Application Priority Data

Nov. 29, 1988 [JP] Japan ................. 63-299572

[51] Int. Cl.$^5$ ................. B29C 35/00; B29D 30/08; B60C 9/02
[52] U.S. Cl. ................. 156/110.1; 156/111; 156/123; 156/396; 156/406.4
[58] Field of Search ................. 156/110.1, 117, 123, 156/124, 130, 133, 396, 397, 405.1, 406, 406.4, 408, 414, 396

[56] References Cited

U.S. PATENT DOCUMENTS 3,325,072 6/1967 Black et al. ................. 156/406.4
4,268,330 5/1981 Komastu et al. ................. 156/111

FOREIGN PATENT DOCUMENTS 593381 8/1987 U.S.S.R. ................. 156/396

Primary Examiner—Michael W. Ball
Assistant Examiner—Gregory J. Wilber
Attorney, Agent, or Firm—Armstrong, Nikaido, Marmelstein, Kubovcik & Murray

[57] ABSTRACT

A process for building pneumatic radial tires comprising (a) a step of switching a first building drum at a first building position and a second building drum at a second building position in a turret manner by turning a body of a building machine, (b) a step for forming a belt cover layer at said second building position by winding at least one fiber cord continuously and spirally on a reinforcing belt that has been previously wound on the building drum, (c) a step for completing a belt-tread assembly at the first building position by winding a cap tread on a belt cover layer that has been previously been wound on the building drum at the second building position concurrent with the operation for winding the fiber cord that is being carried out at the second building position, removing the tire belt-tread assembly from the building drum, and newly winding a reinforcing belt on the building drum from which the belt-tread assembly has been removed, and (d) repeating said steps (a), (b) and (c).

4 Claims, 2 Drawing Sheets

PROCESS FOR BUILDING PNEUMATIC RADIAL TIRES WHEREIN TWO BUILDING DRUMS ROTATE BETWEEN TWO BUILDING POSITIONS

Background of the Invention

The present invention relates to a process for building pneumatic radial tires, and more specifically to a process for building pneumatic radial tires capable of efficiently forming a belt-tread assembly in which a belt cover layer consisting of an endless winding of a fiber cord is provided on a reinforcing belt.

In pneumatic radial tires for passenger cars, it has been attempted to wind a belt cover layer consisting of a fiber cord on at least two layers of reinforcing belts provided in the tread portion, the fiber cord defining an angle of substantially zero degree with respect to the circumferential direction of the tire, in order to improve durability at high speeds. FIG. 3 illustrates a tread portion in a high-performance tire having durability at high speeds, wherein a reinforcing belt B consisting of steel cords of two layers is so arranged between the carcass C and the cap tread T that the cords intersect with each other, and both ends of the reinforcing belt B are covered with a belt cover layer L consisting of a fiber cord which defines an angle of substantially zero degree with respect to the circumferential direction of the tire.

When a radial tire runs at high speeds, in general, both ends of the reinforcing belt tends to rise outwardly in the radial direction due to the centrifugal force, causing a separation. In a radial tire having the structure shown in FIG. 3, however, the belt cover layer L suppresses the rising phenomenon at the ends of the reinforcing belt B to prevent the separation, and improved durability is obtained at high speeds. In order to improve durability at high speeds, it has further been attempted to cover the reinforcing belt B over its full width with the belt cover layer L as shown in FIG. 4, instead of covering only both ends of the reinforcing belt B with the belt cover layer L.

In the step for manufacturing tires, the tread portion consisting of the reinforcing belt B, the belt cover layer L and the cap tread T, is formed by successively winding belt-like materials on the building drum in the circumferential direction and by splicing the ends thereof together. Among them, however, the belt cover layer L consists of fiber cords that are arranged in the circumferential direction of the tire; i.e., one to several fiber cords are wound endlessly and spirally in the circumferential direction of the tire.

The method of endlessly winding the fiber cords to form a belt cover layer is advantageous from the standpoint of improving uniformity of the tire since there is formed no step-like splicing portion that results when the belt-like materials are wound. However, one to several fiber cords must be continuously wound on the building drum several hundreds of times, requiring a very long time for forming a belt cover layer which is detrimental to efficiently forming the tread portion.

Summary of the Invention

An object of the present invention is to provide a process for building pneumatic radial tires wherein in forming a tread portion consisting of a reinforcing belt, a belt cover layer and a cap tread on a building drum, the belt cover layer is formed by winding one to several fiber cords in an endless manner.

Another object of the present invention is to provide a process for building pneumatic radial tires which is capable of efficiently forming a belt-tread assembly that consists of a reinforcing belt, a belt cover layer and a cap tread, while forming the belt cover layer by endlessly winding one to several fiber cords.

To achieve the above objects, the building process of the present invention is put into practice by using a tire building apparatus that is constituted as described below. That is, the tire building apparatus has a body of a building apparatus which is permitted to freely turn about a turning shaft, and wherein two building drums are mounted on the body of the building apparatus maintaining a point symmetrical relationship with respect to the turning shaft, the two building drums being corresponded to a first building position and to a second building position, respectively. The set positions of the two building drums can be alternately switched between the first position and to the second position accompanying the turn of the body of the building apparatus. Further, a reinforcing belt applying device, a cap tread applying device, and a belt-tread assembly transfer device are arranged at the first building position, and a fiber cord winding device is arranged at the second building position.

By using such a tire building apparatus, the method of building tires of the present invention comprises:

(a) a step for turning a body of the building apparatus to alternately change the set positions of one building drum set to a first building position and of a second building drum set to a second building position;

(b) a step for forming a belt cover layer by winding at least one fiber cord endlessly and spirally using a fiber cord winding device on a reinforcing belt that has been wound already on one building drum switched to the second building position as a result of changing the set positions of said two building drums;

(c) a step for completing the belt-tread assembly by winding a cap tread using a cap tread applying device on the reinforcing belt and on a belt cover layer thereon that have been wound already on the other building drum switched to the first building position in parallel with the operation for forming the belt cover layer carried out at the second building position, removing said belt-tread assembly from the building drum using a transfer device, and newly winding a reinforcing belt using the reinforcing belt applying device on the building drum from which the belt-tread assembly has been removed, successively in the order mentioned; and (d) repeating said steps (a), (b) and (c).

Thus, while the belt cover layer is being wound on the building drum consuming an extended period of time, there are carried out the operation for completing the belt-tread assembly by winding a cap tread on the belt cover layer that is wound already on the other building drum, the operation for removing the completed belt-tread assembly, and the operation for winding the reinforcing belt for newly forming the belt-tread assembly. Therefore, the time for forming the belt-tread assembly is shortened and the operation efficiency is improved.

Detailed Description of the Preferred Embodiments

Figure 1:
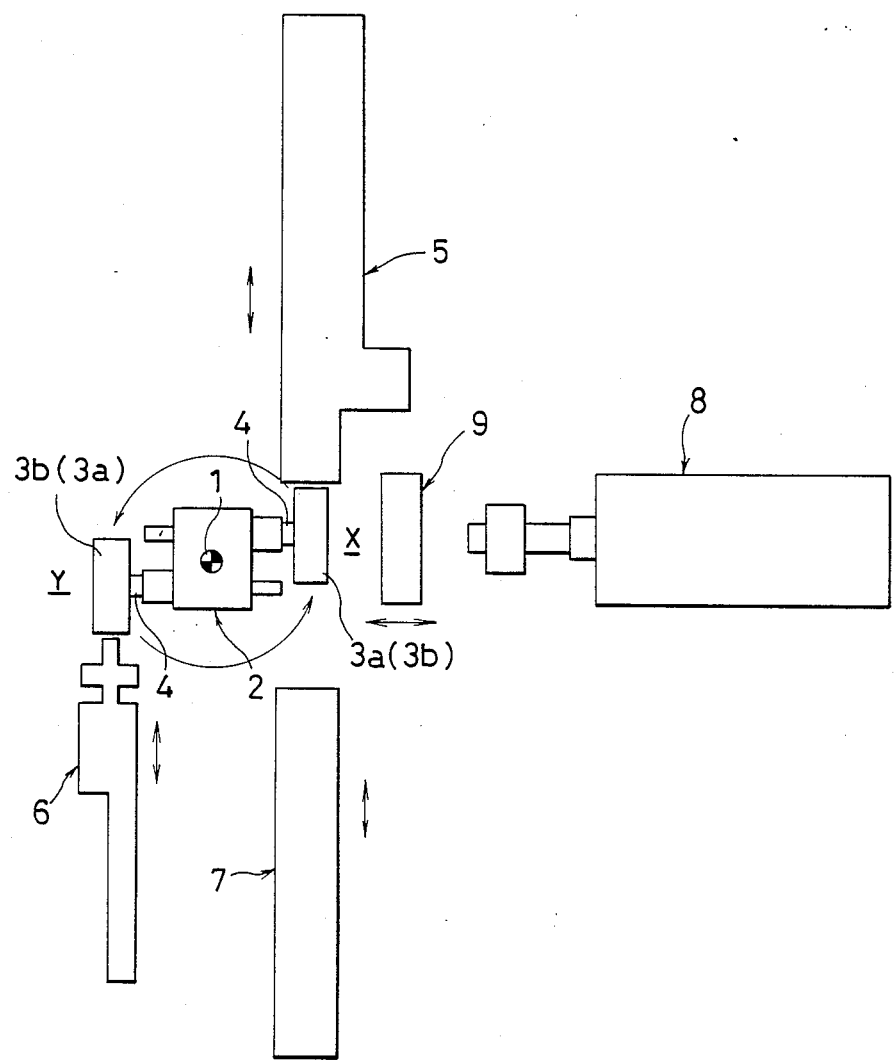
FIG. 1 is a plan view which schematically illustrates a tire building apparatus for putting the building process of the present invention into practice.

In a tire building apparatus shown in FIG. 1, a body 2 of a building apparatus has a turning shaft 1 in a perpendicular direction and is allowed to turn about the turning shaft 1 in a horizontal plane. Building drums 3a and 3b are supported by the body 2 of the building apparatus via drive shafts 4, 4 maintaining a point symmetrical relationship with the turning shaft 1 as a center as viewed on a plane. When the body 2 of the building apparatus is at rest, one of the two building drums 3a and 3b is set to a first building position X and the other one is set to a second building position Y. When the body 2 of the building apparatus is turned in a horizontal plane, their set positions are alternately changed in a turret manner. The set positions of the two building drums 3a and 3b may be changed by turning the body 2 of the building machine in one direction only or in either the forward direction or the reverse direction alternately.

At the first building position X, a reinforcing belt applying device 5 and a cap tread applying device 7 are arranged at the same level and on opposite sides; i.e.; in front and at the back of the axis of rotation of the building drum 3a (3b) set to this position. A belt-tread assembly transfer device 9 is arranged at a position between the two devices 5 and 7 but being spaced or separated away in the direction of the drum shaft. The reinforcing belt applying device 5 and the cap tread applying device 7 may also be arranged over and under the building drum 3a (3b) instead of being arranged at the same level in front and at the back thereof.

The reinforcing belt applying device 5 is provided to approach the building drum 3a (3b) or to retreat therefrom, and is so constituted as to supply and wind a belt-like reinforcing belt member on the building drum 3a (3b). Likewise, the cap tread applying device 7 is provided to approach the drum 3a (3b) or to retreat therefrom, and is so constituted as to supply and wind a belt-like cap tread member on the building drum 3a (3b). Further, the transfer device 9 is provided to approach the building drum 3a (3b) or to retreat therefrom, and is so constituted as to remove from the building drum 3a (3b) the belt-tread assembly that has been completed on the building drum and to carry it to a tire building apparatus 8 of a next step installed in a separate place. These devices 5, 7 and 9 may all be the known ones.

At the second building position Y, a fiber cord winding device 6 is arranged being opposed to the building drum 3b (3a) set at this position. The fiber cord winding device 6 is provided to approach the building drum 3b (3a) or to retreat therefrom, and is so constituted as to endlessly and spirally wind one to several fiber cords on the building drum 3b (3a) thereby to form a belt cover layer. The fiber cord winding device 6 may be arranged either over or under the building drum 3b (3a).

Figure 2:
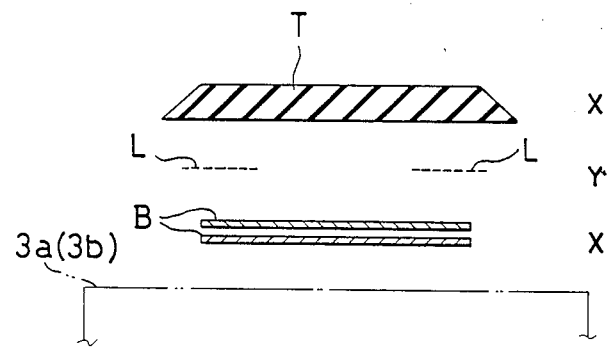
FIG. 2 is a diagram showing the condition where members for constituting the tread portion are successively stacked on a building drum.

Using the above-mentioned tire building apparatus, the reinforcing belt B, the belt cover layer L and the cap tread T are wound on the building drum 3a (3b) as shown in FIG. 2 to build the belt-tread assembly in a manner as described below. In the first building position X, first, the reinforcing belt B is wound by the reinforcing belt applying device 5 on the building drum 3a (3b) set to the first building position. The building drum 3a (3b) is then switched to the second building position Y where the fiber cord is endlessly wound by the fiber cord winding device 6 on the reinforcing belt B that was wound at the first building position X in order to form the belt cover layer L. Thereafter, the building drum 3a (3b) is switched again to the first building position, and the cap tread T is wound by the cap tread applying device 7 on the reinforcing belt B and on the belt cover layer L that have been wound on the building drum 3a (3b) in order to complete the belt-tread assembly. The thus formed belt-tread assembly is removed from the building drum 3a (3b) by the transfer device 9, and is carried to the tire building apparatus 8 of the next step.

According to the tire building method of the present invention, the operation for forming the belt-tread assembly is effected for the two building drums 3a and 3b simultaneously as described below.

First, when the set positions of the two building drums 3a, 3b are switched to the condition of FIG. 1 by turning the body 2 of the building apparatus, the building drum 3b at the second building position Y has already been wound with the reinforcing belt B by the operation at the first building position X performed before switching, and the building drum 3a at the first building position X has already been wound with the reinforcing belt B and with the belt cover layer L by the operation at the second building position Y performed before switching.

Figure 3:
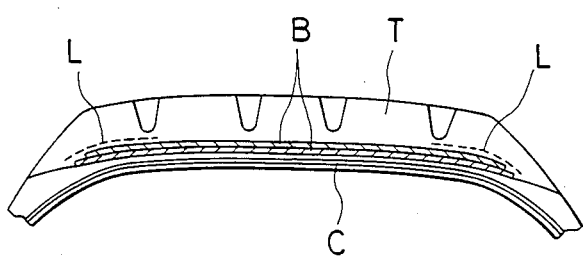
FIG. 3 is a section view showing a tread portion of a pneumatic radial tire.
Figure 4:
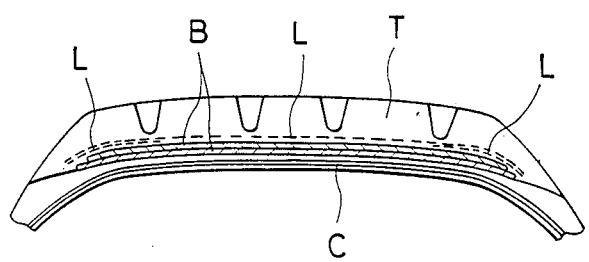
FIG. 4 is a section view showing another tread portion of a pneumatic radial tire.

At the second building position Y, therefore, the fiber cord is wound by the fiber cord winding device 6 endlessly and spirally on the reinforcing belt B that has already been wound on the building drum 3b thereby to form a belt cover layer L. The belt cover layer L may be so formed as to cover only both ends of the reinforcing belt B as shown in FIGS. 2 and 3, or may be so formed as to cover the whole width of the reinforcing belt B as shown in FIG. 4. The belt cover layer is formed after the fiber cord is wound several hundred times consuming a very long period of time.

While the operation is being carried out for such a long period of time at the second building position, there are successively carried out three steps at the first building position. That is, there are carried out at the first building position X a step for completing the belt-tread assembly by winding a cap tread T using the cap tread applying device 7 on the reinforcing belt B and on the belt cover layer L that have been wound already on the building drum 3a, a step for removing the belt-tread assembly from the building drum 3a by the transfer device 9 and for carrying it to the tire building machine 8 of the next step, and a step for newly winding the reinforcing belt B by the reinforcing belt applying device 5 on the building drum 3a from which the belt-tread assembly has been removed.

After the operations that are carried out in parallel are completed at the two positions X and Y, the body 2 of the building apparatus is turned to change over the set positions of the two building drums 3a and 3b, and then the aforementioned operations are repeated.

As described above, while the operation for winding the belt cover layer is being carried out at the second building position Y consuming a long period of time, there are at the same time carried out in parallel therewith at the first building position X the operation for completing the belt-tread assembly by winding the cap tread, the operation for removing the completed belt-tread assembly, and the operation for newly winding the reinforcing belt on the empty building drum in readiness for newly preparing to next belt-tread assembly. Accordingly, the time required for forming a belt-tread assembly is shortened contributing to improving the productivity.

What is claimed is:

1. In a tire building apparatus having a body of a building apparatus which is freely rotatable about a turning shaft, two building drums mounted on said body of the building apparatus and maintaining a symmetrical point with respect to said turning shaft so as to correspond to a first building position and a second building position, respectively, the positions of said two building drums being allowed to be alternately changed over between said first position and said second position by the turn of said body of the building apparatus, said tire building apparatus further having a reinforcing belt applying device, a cap tread applying device and a belt-tread assembly transfer device that are arranged at said first building position, and a fiber cord winding device that is arranged at said second building position, a process for building radial tires comprising:

(a) a step for turning the body of the building apparatus to alternately change a position of one building drum to the first building position and of the other building drum to the second building position;

(b) a step for forming a belt cover layer by winding at least one fiber cord endlessly and spirally using the fiber cord winding device on a reinforcing belt that has been previously wound on the building drum switched to the second building position as a result of changing the positions of said two building drums;

(c) a step for completing the belt-tread assembly by winding a cap tread using said cap tread applying device on a reinforcing belt and on a belt cover layer thereon that have been previously wound on the building drum switched to the first building position concurrent with the operation for forming the belt cover layer carried out at the second building position, removing said belt-tread assembly from the building drum using said transfer device, and newly winding a reinforcing belt using said reinforcing belt applying device on the building drum from which the belt-tread assembly has been removed, all successively in the order mentioned; and (d) repeating steps (a), (b) and (c).

2. A process for building radial tires according to claim 1, wherein the turning shaft of said body of the building apparatus is vertically provided, and said two building drums are turned in a turret manner on a horizontal plane.

3. A process for building radial tires according to claim 1, wherein said reinforcing belt applying device and said cap tread applying device are arranged at the same level and on opposite sides of an axis of rotation of a building drum set to said first building position.

4. A process for building radial tires according to claim 1, wherein one of said reinforcing belt applying device and said cap tread applying device is arranged over and the other of said reinforcing belt applying device and said cap tread applying device is arranged under a building drum that is set to said first building position.

* * * * *